May 17, 1932.   C. H. BEACH   1,859,068
ELECTRIC GRINDER
Filed May 1, 1929   3 Sheets-Sheet 1
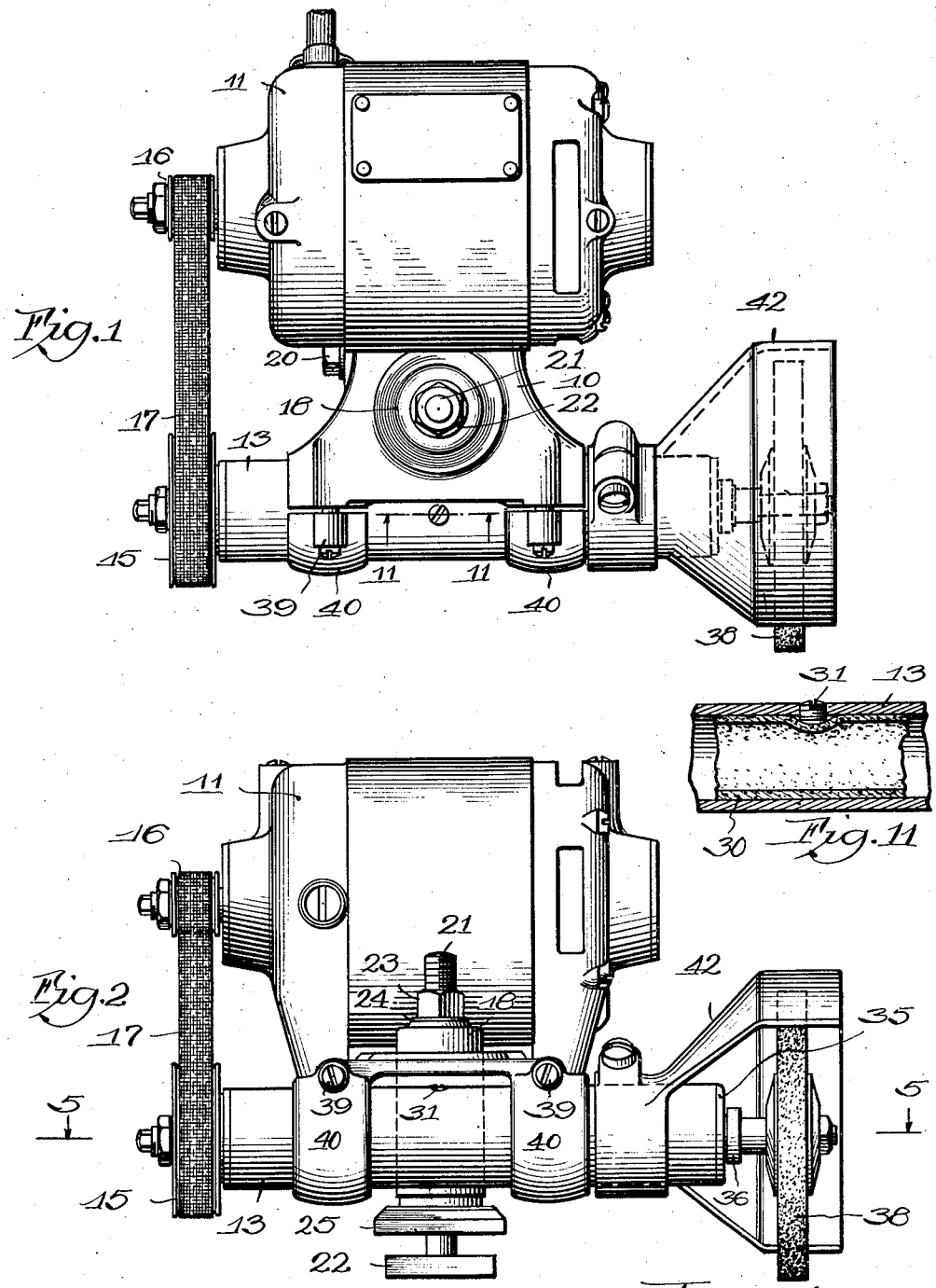

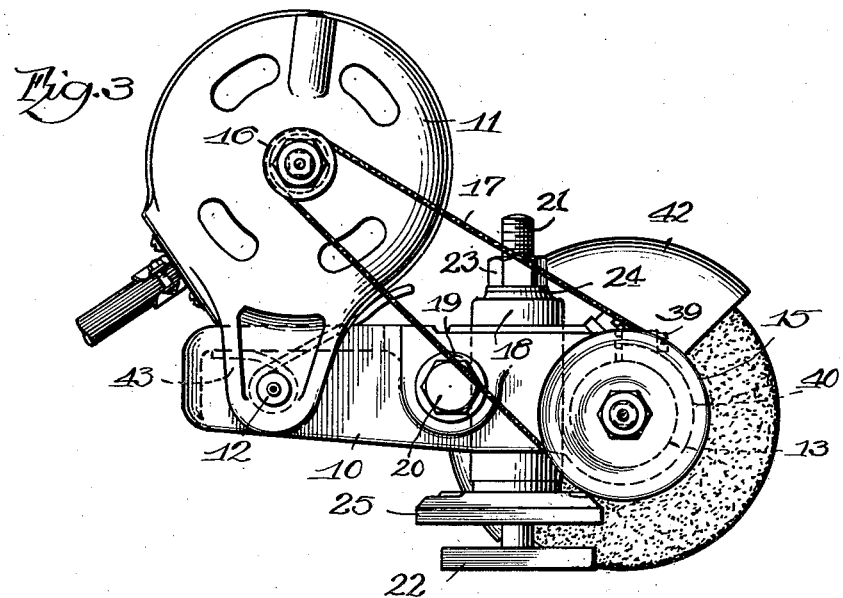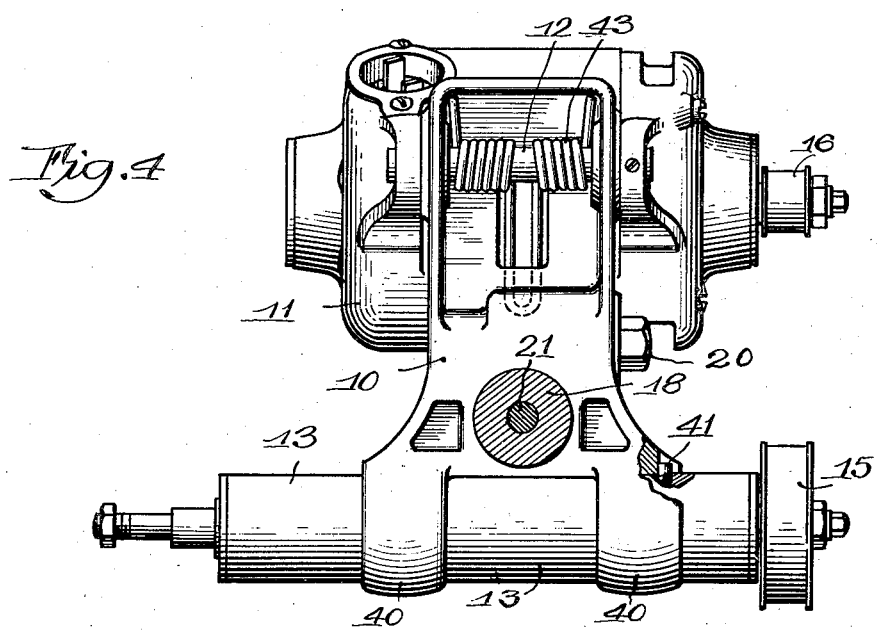

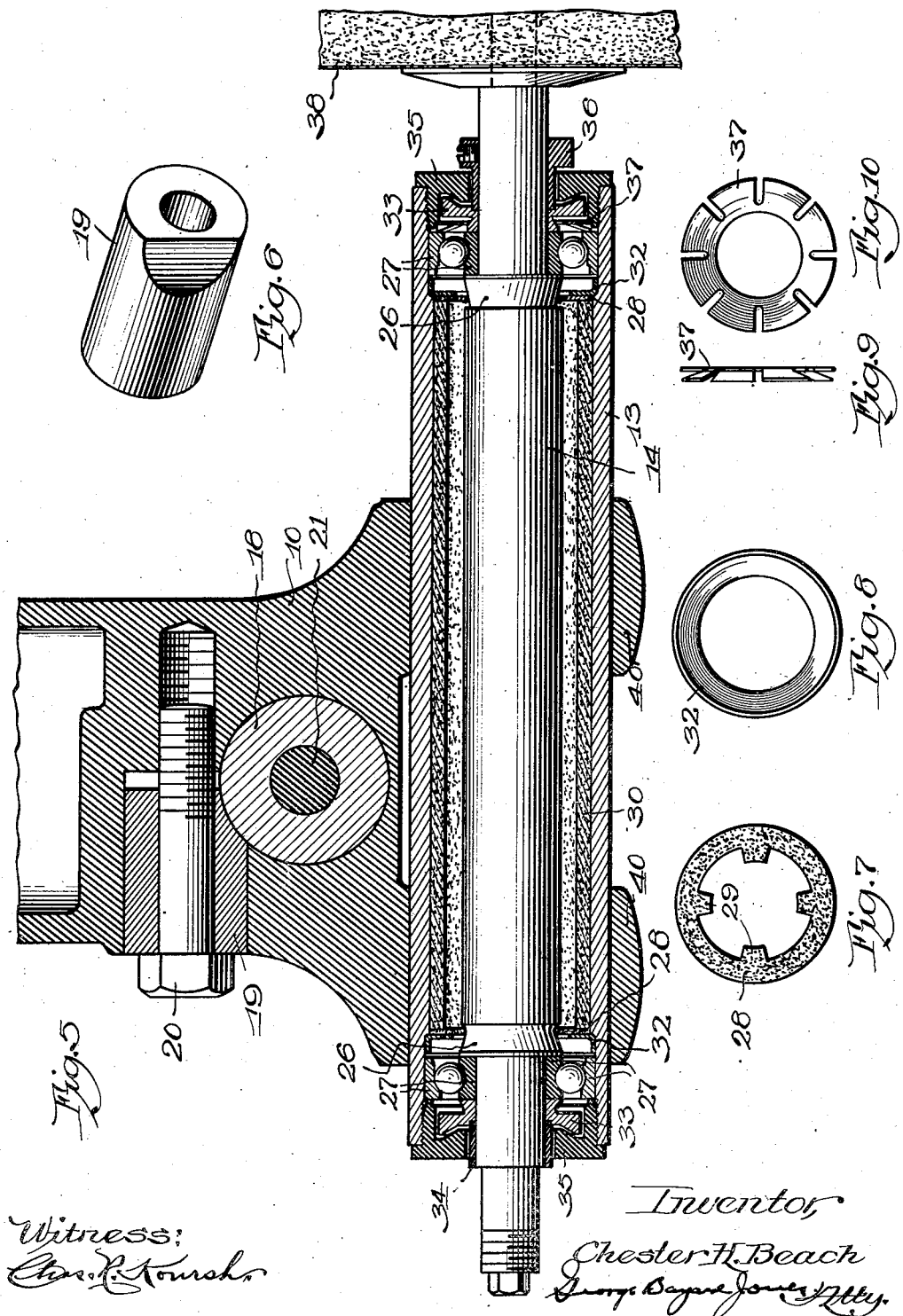

Patented May 17, 1932

1,859,068

UNITED STATES PATENT OFFICE

CHESTER H. BEACH, OF RACINE, WISCONSIN, ASSIGNOR TO THE DUMORE COMPANY, A CORPORATION OF WISCONSIN

ELECTRIC GRINDER

Application filed May 1, 1929. Serial No. 359,483.

My invention relates to improvements in electric grinders and other portable tools.

Such tools, when in use, are usually mounted on lathes, planers, shapers or other machine tools and are clamped thereto by a bolt, the nut on which, when tightened, often distorts the frame or base of the portable tool. In the case of an electric grinder, for example, the spindle carrying the grinding wheel is very accurately mounted in ball bearings and may rotate from 3500 to 35000 R. P. M. or more and is relied on for exceedingly accurate work, the grinding wheel making a cut as fine as a fraction of a thousandth of an inch. The distortion of the base referred to is often enough to disturb the adjustment of the spindle and thus destroy the precision of the work.

One object of my invention is to provide an improved mounting for a precision tool of this character whereby the stresses applied to the clamping bolt or mounting post are not communicated to the frame of the portable tool, thereby avoiding the distortion referred to.

Considerable difficulty is encountered also in properly oiling a spindle running at such excessive speeds and in various positions other than horizontal, the bearings overheating readily and the oil leaking out when the spindle is tilted, resulting in obvious difficulties.

Another object of my invention is to provide improved means for oiling the spindle whereby it may operate at the required high speeds without overheating, and whereby it may operate satisfactorily and for long periods of time in inclined as well as in horizontal positions with a minimum quantity of oil. Other objects and advantages will be apparent from the description hereinafter given.

In the accompanying drawings, in which a commercial embodiment of the invention is illustrated, Fig. 1 is a top plan view of a portable electric grinder;

Fig. 2 is a front elevation thereof;

Fig. 3 is a side elevation;

Fig. 4 is a bottom view;

Fig. 5 is an enlarged section on the line 5—5 of Fig. 2;

Fig. 6 is a perspective view of a lock bushing;

Fig. 7 is an elevation of a felt ring;

Fig. 8 is an elevation of a cupped washer;

Fig. 9 is a side view of a thrust washer;

Fig. 10 is a front view thereof; and

Fig. 11 is a fragmentary section of a detail taken on line 11—11 of Fig. 1.

The grinder comprises a suitable base or frame 10 having an electric motor 11 mounted thereon about a pivotal support 12 and having a cylindrical housing 13 or quill removably secured to the other end. Said housing encloses a rotatable spindle 14 (see Fig. 5) mounted in ball bearings, as hereinafter explained, and having a pulley 15 mounted on one end thereof (see Figs. 1 and 2) driven by a pulley 16 on the armature shaft of the motor by means of a belt 17.

The base, which in the position shown in the drawings is substantially horizontal, has a vertical opening therein of circular cross section within which fits a mounting post or tool post 18 about which the grinder frame may be rotated and to which it may be frictionally clamped by means of a lock bushing 19 held in place by a stud 20. The inner end of the lock bushing is curved to fit the cylindrical surface of the mounting post 18 as shown in Figs. 5 and 6, and serves to hold the grinder frame in any position of adjustment, either vertically or angularly on said post 18.

Said mounting post has a longitudinal opening therethrough in which is received a T bolt 21 having a head 22 at the bottom which may be drawn upwardly by a nut 23 turning against a washer 24 on the top of the mounting post 18 to clamp said post firmly in place on a lathe, planer or shaper, etc., the lower end of the mounting post having an enlarged head 25 which, with the head 22 of the T bolt, comprise the clamping members. It will be seen that stresses applied to the mounting post 18 by tightening the nut 23 excessively will not be transmitted to the frame 10 and therefore the latter will not be distorted nor will the spindle 14 be affected in any way, either in its parallel relation to the armature shaft or otherwise, by any excessively tight clamping of the mounting post to its immediate support.

The spindle 14, as shown in Fig. 5, has a conical portion 26 or reverse taper at each end beyond which are portions of reduced diameter. Ball bearing raceways 27 surround these reduced portions. Oil is supplied to the raceways from said conical portions by means of washers 28 of absorbent material having a capillary attraction, such as felt, for example. In Fig. 7 one of these washers is shown as having a plurality of inward radial extensions 29 which latter contact with the conical surfaces 26. One of these felt washers is arranged near each end of the housing 13 in contact with a cylinder 30 of similar material such as felt. An oil opening is provided in the upper part of the housing 13 and is normally closed by a small screw 31 as shown in Fig. 11, whereby oil may be introduced through said opening in sufficient quantities to saturate the felt cylinder, the oil also passing through the felt washers 28 in each end to the tapering surfaces as previously explained. A very small amount of oil is all that is necessary to properly oil the bearings, and this amount is determined by the area of the radial extension 29 in contact with said conical surfaces. Such small amount of oil as is conveyed to said conical surfaces works its way along the latter, through centrifugal force, finding its way into the inner raceway and eventually to the outer raceway. In fact, when the spindle is rotating at high velocity, the chamber adjacent said ball bearings is apparently filled with a fine oily mist, although the actual amount of oil used by the bearings is so slight as to require the further addition of only a small amount of oil to the felt cylinder 30 at long intervals of time, for example, many weeks.

The felt washers 28 are held against the end of the felt cylinder by cupped metal washers 32 (see Fig. 8). Immediately beyond the ball bearing is a ring 33 of special configuration, held in place by a pulley spacing ring 34, the latter being surrounded by a cap 35 having screw threaded engagement with the end of the housing 13, as shown at the left hand end of said housing in Fig. 5 for example. A clearance is provided between said members 33, 34 and 35, providing open communication between the ball bearing chamber and the outer air by a circuitous passageway which prevents the escape of any material quantity of oil, regardless of whether the grinder is mounted with the spindle in horizontal, inclined or vertical position.

At the right hand end is a similar arrangement except that a slightly different collar 36 surrounds the reduced end of the shaft and a thrust washer 37, of special configuration (see Figs. 9 and 10) is located between the ball bearing raceways and the screw threaded cap 35 to take up the thrust, due to elongation of the parts caused by temperature changes.

A suitable grinding wheel 38 may be mounted on the reduced end of the shaft in the usual manner, adapted for external grinding, or a tapering spindle may be employed with a small grinding wheel at the end suitable for internal grinding. To adapt the grinder readily to different classes of service, a number of different cylindrical housings 13 or "quills" may be furnished with the grinder, which are interchangeable, and may be readily mounted in place by loosening screws 39 which pass through the clamps 40 shown in Figs. 1 and 2, sliding out one quill, sliding in another and clamping the latter in place. A locating pin 41 (see Fig. 4) on each quill is received within a recess in the base, thus insuring alignment of the pulleys and the location of the oil hole at the top of the quill.

The grinding wheel 38 may be provided with a suitable guard 42, if desired.

In order to maintain the belt tension, a coiled spring 43 is provided which surrounds the shaft 12, with its ends bearing against part of the web of the frame casting 10 and its middle portion, which is in the form of a loop, bearing against the outside of the motor, as shown in Figs. 3 and 4. This maintains the belt tension without the necessity of manual adjustment such as has been used heretofore in devices of this character.

What I claim is:

1. A portable tool having a cylindrical housing, a cylindrical member of fibrous material within the same, ball bearing raceways at opposite ends of said housing, a spindle mounted in said ball bearing raceways and having a reverse taper adjacent each raceway and a washer of fibrous mterial in contact with said fiber cylinder and also in contact with said reverse taper portions to supply oil to said ball bearing raceways.

2. In a portable grinder, a cylindrical housing, a ball bearing raceway in each end thereof, a spindle supported by said raceways, screw threaded caps holding said raceways in place, a felt tube fitting the inside of said housing between said raceways, a felt washer at each end of said felt tube and having inwardly projecting extensions engaging said spindle and a thrust washer between one of said raceways and the corresponding screw threaded cap.

3. A portable tool having a cylindrical housing, a ball bearing raceway within the same, a cup shaped washer adjacent said raceway, a felt ring in contact with said washer, means for supplying oil to said felt ring, a spindle having a reduced end supported in said raceway, a reverse taper between said spindle and said reduced end, said felt washer having inward extensions engaging said reverse taper, a screw threaded cap surrounding the reduced end of said spindle and engaging the end of said housing, a thrust washer between said ball bearing raceway and said screw threaded cap and two additional rings within said cap each surrounding said reduced extension and spaced from each other and from said cap to provide a circuitous passageway.

4. A spindle assembly comprising a housing, an anti-friction bearing adjacent each end thereof, a rotatable spindle in said housing mounted in said bearings, said spindle having cone shaped portions one disposed inwardly of each of said bearings, said housing having an oil opening, and fibrous means within said housing contacting with said cone shaped portions for conveying oil from said opening to said cone shaped portions of said spindle for delivery by said portions to the adjacent bearing.

5. A spindle assembly comprising a housing, a pair of anti-friction bearings in said housing, a spindle mounted in said bearings, said spindle having frusto-conical portions one adjacent each of said bearings to cause oil to move along the surface thereof to the respective bearing, fibrous means within said housing spaced from said spindle, said housing having one or more oil openings therein through which oil can be supplied to said fibrous means, and a pair of members each contacting with said fibrous means and with one of said portions of said spindle for conveying oil from said fibrous means to said portions.

6. A spindle assembly comprising a housing, a pair of anti-friction bearings in said housing, a spindle mounted in said bearings, said spindle having flaring portions one adjacent each of said bearings to cause oil to move along the surface thereof to the respective bearing, fibrous means within said housing spaced from said spindle, said housing having one or more oil openings therein through which oil can be supplied to said fibrous means, and a pair of fibrous washers surrounding said spindle in contact with said fibrous means and having radial projections contacting with said portions of said spindle for conveying oil from said fibrous means to said portions.

In testimony whereof, I have subscribed my name.

CHESTER H. BEACH.